United States Patent
Hobbs et al.

(10) Patent No.: US 6,904,480 B1
(45) Date of Patent: Jun. 7, 2005

(54) TESTING A BUS USING BUS SPECIFIC INSTRUCTIONS

(75) Inventors: William A. Hobbs, Beaverton, OR (US); Doug Boyce, Olympia, WA (US); Kenneth B. Oliver, Newberg, OR (US); Pierre M. Brasseur, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 53 days.

(21) Appl. No.: 08/992,222

(22) Filed: Dec. 17, 1997

(51) Int. Cl.⁷ ............................................. G06F 13/00
(52) U.S. Cl. ...................... 710/107; 710/100; 714/43; 714/56
(58) Field of Search ................. 710/100, 107; 714/43, 56

(56) References Cited

U.S. PATENT DOCUMENTS

| | | | |
|---|---|---|---|
| 4,053,947 A | * | 10/1977 | Carlsson et al. |
| 5,086,500 A | * | 2/1992 | Greub .......................... 345/500 |
| 5,142,673 A | | 8/1992 | De Angelis et al. |
| 5,220,662 A | | 6/1993 | Lipton |
| 5,271,020 A | | 12/1993 | Marisetty |
| 5,319,776 A | | 6/1994 | Hile et al. |
| 5,423,050 A | * | 6/1995 | Taylor et al. ................ 395/575 |
| 5,504,689 A | * | 4/1996 | Fiebrich et al. ............. 364/481 |
| 5,535,345 A | | 7/1996 | Fisch et al. |
| 5,546,546 A | | 8/1996 | Bell et al. |
| 5,548,733 A | | 8/1996 | Sarangdhar et al. |
| 5,555,372 A | | 9/1996 | Tetreault et al. |
| 5,555,382 A | | 9/1996 | Thaller et al. |
| 5,621,900 A | | 4/1997 | Lane et al. |
| 5,696,910 A | * | 12/1997 | Pawlowski ................... 395/280 |
| 5,701,409 A | * | 12/1997 | Gates ....................... 395/183.17 |
| 5,727,218 A | * | 3/1998 | Hotchkin ..................... 395/733 |
| 5,748,983 A | * | 5/1998 | Gulick et al. ................ 395/842 |
| 5,752,035 A | * | 5/1998 | Trimberger .................. 395/705 |
| 5,802,317 A | * | 9/1998 | Wiseman et al. ........... 395/280 |
| 5,850,512 A | * | 12/1998 | Song ....................... 395/183.19 |
| 5,892,962 A | * | 4/1999 | Cloutier ................. 395/800.16 |
| 5,938,777 A | * | 8/1999 | Carter ........................... 714/32 |
| 6,463,554 B1 | | 10/2002 | Budelman et al. |

* cited by examiner

Primary Examiner—Frantz B. Jean
(74) Attorney, Agent, or Firm—Shireen I. Bacon

(57) ABSTRACT

A system for generating transactions on a bus includes at least one instruction memory storing predefined bus stimuli instructions and at least one phase generator coupled between the bus and the instruction memory for providing signals to the bus in response to the instruction memory.

12 Claims, 6 Drawing Sheets

TESTING A BUS USING BUS SPECIFIC INSTRUCTIONS

BACKGROUND OF THE INVENTION

1. Field of the Invention

The invention relates to a device for generating bus transactions and responses, and more specifically, to a bus transaction/response generator that creates user-specified bus cycles under high level language control.

2. Description of Related Art

FIG. 1 illustrates a portion of a typical computer system, such as a personal computer (PC), including one or more processors 10 and a chipset 12 coupled together by means of a processor bus 14. The chipset 12 is coupled to a memory device 15 such as a dynamic random access memory (DRAM) device and an input/output (I/O) bus 16.

The processor 10 is the "brains" of the computer. The processor 10 includes an arithmetic logic unit (ALU), which performs arithmetic and logical operations and a control unit, which extracts instructions from memory and decodes and executes them, calling on the ALU when necessary. A symmetric system is a system that includes multiple processors, wherein each of the processors is capable of executing any task.

A bus is like a highway on which data travel within a computer. It is simply a channel over which information flows between two or more devices. A bus normally has access points, or places into which a device can tap to become attached to the bus, and devices on the bus can send to, and receive information from, other devices. The processor bus 14 is the bus that the chipset 12 uses to send information to and from the processor 10. Computer systems also typically include at least one I/O bus 16, such as a peripheral component interconnect (PCI) bus, which is generally used for connecting performance-critical peripherals to the memory 15, chipset 12, and processor 10. For example, video cards, disk storage devices, high-speed networks interfaces generally use a bus of this sort. PCs typically also include additional I/0 buses, such as an industry standard architecture (ISA) bus, for slower peripherals such as mice, modems, regular sound cards, low-speed networking, and also for compatibility with older devices.

The system chipset 12 controls this communication, making sure that every device in the system is talking properly to every other device. The chipset 12 is an integrated set of components that perform many of the vital functions of the computer system, including functions that once required several separate chips. Typical functions performed by the chipset 12 include memory controller, which allows the processor 10 to access the computer memory 15; I/O bus bridge, which interfaces the processor bus 14 with other computer buses, such as the PCI or ISA buses; real-time clock (RTC); direct memory access (DMA) controller, which allows system devices to directly access the memory 15 rather than accessing the memory 15 through the processor 10, keyboard controller, mouse controller, etc.

Each transaction initiated on the processor bus 14 goes through three general stages: the arbitration phase, the address phase, and the data phase. For a component, or "agent," on the bus 14 to initiate a transaction on the bus 14, the agent must obtain "ownership" of the bus 14. This happens during the arbitration phase, where the agent initiating the transaction, known as the requesting agent, signals that it wants to use the bus 14. Once the requesting agent acquires bus ownership, it sends an address out on the bus 14 during the address phase. The other agents on the bus 14 receive the address and determine which of them is the target of the transaction—the target agent. Finally, during the data phase, the requesting agent waits for the target agent to provide the requested read data or to accept the write data.

Bus transactions on more complex buses, such as the Intel® Pentium® Pro bus, include additional phases. The Pentium® Pro bus, for example, includes the following transaction phases: arbitration phase, request phase, error phase, snoop phase, response phase, and data phase. The Pentium® Pro bus is divided into groups of signals that generally correspond to the transaction phases, each of which is only used during the respective phase of a transaction. The operation of the Pentium® Pro bus is explained in detail in Pentium® Pro Processor System Architecture, by Tom Shanley, MindShare, Inc., chapters 8–17, incorporated herein by reference in its entirety.

When a requesting agent wishes to obtain bus ownership to initiate a bus transaction, it arbitrates for ownership of the request signal group. In a symmetric system (a multiple-processor system wherein each processor is capable of handling any task), multiple processors may simultaneously request ownership of the bus. These processors are referred to as symmetric agents, and the process for determining which symmetric agent gets ownership of the bus is known as symmetric arbitration. In comparison, priority agents are agents on the bus that arbitrate for bus ownership by asserting a priority signal.

Once the requesting agent has ownership of the request signal group, it drives a transaction request onto the request signal group during the request phase. A Pentium® Pro processor bus transaction request phase is two clocks in duration. Address, transaction type and other transaction information is output in two packets during the request phase; one packet during each of the two clocks of the request phase. The other bus agents receive the transaction request and determine which of them is the target agent.

Moreover, specific bus transactions may take a relatively long time to complete. For instance, the target agent may be busy and therefore, not available to immediately complete the request. In this case, the target agent may choose to defer the transaction request to a later time, in which case the target agent is called a deferring agent. Further, data reads and writes may often take a significant amount of time to complete. The Pentium® Pro bus is designed to prevent busy or slow bus agents from tying up the bus for an extended time period. If the target of a data read or write will take a long time to complete the data transfer, it instructs the requesting agent to terminate the transaction, then the targeted agent will initiate a transaction to transfer the data when the read or write is completed.

During the error phase, the bus agents receiving the transaction request inspect the request to determine whether it was corrupted during the transmission by verifying the transaction request's parity bit. Any of the receiving agents that detect a parity error assert the error phase signal. The requesting agent checks the error phase signal at the end of the error phase to see if the request was received without error. If an error was detected, the remaining transaction phases are canceled and the transaction may be retried. If the receiving agents all receive the request without error, the requesting agent proceeds to the next phase.

If the initiated transaction is a memory transaction, agents receiving the transaction request that have an internal cache perform a cache lookup, or "snoop," to determine whether the requested memory line is in any agent's cache. These agents are referred to as snooping agents. Snooping agents provide the snoop results via the snoop phase signals. During the snoop phase, the requesting agent and the response agent sample the snoop phase signals. Once the snoop phase is complete, the requesting agent proceeds to the response phase and begins sampling the response phase signals. The response agent notifies the requesting agent how it intends to handle the request via the response phase signals.

Finally, if the transaction involves a data transfer, the requesting agent continues with the data phase. If the bus transaction is a data write transaction, the requesting agent delivers the data to the response agent during the data phase. If it is a data read transaction, the response agent delivers the data to the requesting agent. The bus transaction is complete when the data phase is finished.

The Pentium® Pro bus is designed to allow various phases of several different bus transactions to occur simultaneously to improve bus performance. When a request agent finishes with the signal group for a specific phase, it relinquishes control of that signal group and takes ownership of the signal group for the next phase. For example, once the request agent has issued its transaction request and is ready to check the error phase signals, it no longer requires the use of the request phase signals. Thus, it relinquishes control of the request phase signals and allows another bus agent to take control and initiate a transaction.

Components, such as processors and chipsets, coupled to complex buses often contain bugs that cause them to fail during operation. In the failing scenarios, the components frequently respond incorrectly to specific bus transaction sequences, even when the bus transaction sequence is "legal"; in other words, there is nothing in the bus transaction sequence that should have caused the component to fail. The process of correcting these bugs requires inducing the failure under controlled conditions to isolate the bug. Part of this process may require repeating the bus transaction sequence corresponding to the failure.

Current practices for validating bus/component interactions in which failures occur may include operating a processor on a bus using standard assembly language to generate bus transactions. Assembly language, however, has little correlation to the types of bus transactions being generated, offers little control over the exact sequence of bus cycles produced, and offers almost no control over the relative timing between back to back bus transaction phases.

Moreover, this problem is compounded when one or more out-of-order processors are bus agents. An in-order processor fetches a set of instructions and executes them in a sequential program order. On the other hand, an out-of-order processor improves instruction execution performance by executing instructions that are ready for execution before instructions that are not ready, even if the ready instruction is later in the instruction sequence. This prevents the processor from stalling while an instruction is made ready for execution. For example, a non-ready instruction awaiting data from a memory read does not stall the execution of later instructions in the instruction stream that are ready to execute. Thus, with prior art assembly language controlled, processor-generated bus transactions using an out-of-order processor, the processor controls the bus transaction sequences, rather than a technician attempting to generate a specific sequence of bus transactions.

A similar problem occurs in the development of components such as chipsets and processors. In the early design stages, the components being developed are simulated in a software environment and are often driven by a high-level bus model known in the art as a bus functional model (BFM). A simulation stimulus software language may then be used to exercise the simulated system. While these methods provide a designer a high level of control, observability and repeatability when testing system designs, the simulation environments are extremely slow, typically operating at about 1–10 Hz. Further, there is no corresponding capability for repeating the simulation on actual systems (hardware) during the design stages that provides the desired control, observability, and repeatability.

Thus, a need exists for a system that generates precisely controlled, user-specified bus transactions at an acceptable speed.

SUMMARY OF THE INVENTION

In one aspect of the invention, a system for generating transactions on a bus includes at least one instruction memory storing one or more predefined bus stimuli instructions, and at least one phase generator coupled between the bus and the instruction memory for providing signals to the bus in response to the instructions.

In another aspect of the invention, a method for generating transactions on a bus includes receiving instructions representing predefined bus stimuli. The instructions are converted to signals that, when applied to the bus, execute at least one phase of a bus transaction.

In yet another aspect of the invention, a method for verifying the operation of at least one bus agent using a bus transaction generator is presented. The bus transaction generator provides bus stimuli in response to a predefined sequence of bus transactions and in response to signals received from the bus. The method includes coupling at least one bus agent to the bus and coupling the bus transaction generator to the bus. A sequence of bus transactions is defined and assembled into an object file representing bus stimuli. The method further includes initializing the bus agent and executing the bus stimuli.

BRIEF DESCRIPTION OF THE DRAWINGS

Other objects and advantages of the invention will become apparent upon reading the following detailed description and upon reference to the drawings in which.

Figure 1:
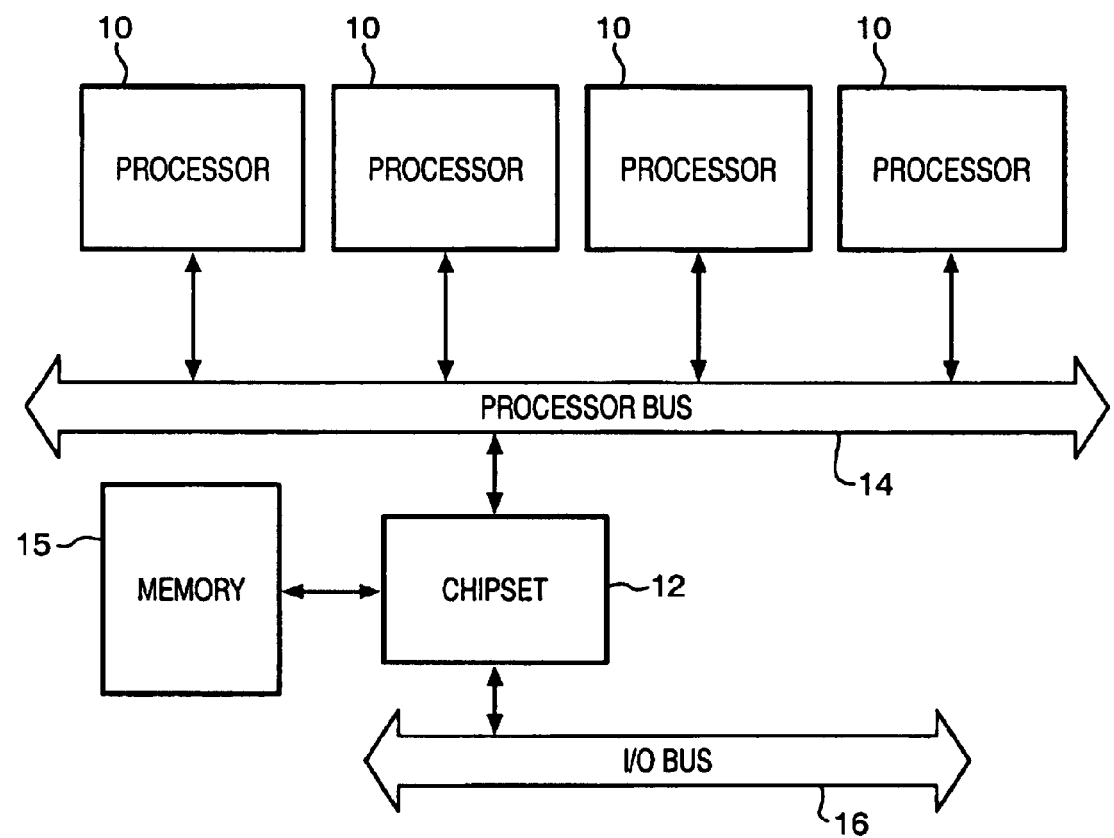
FIG. 1 is a block diagram of a prior art computer system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
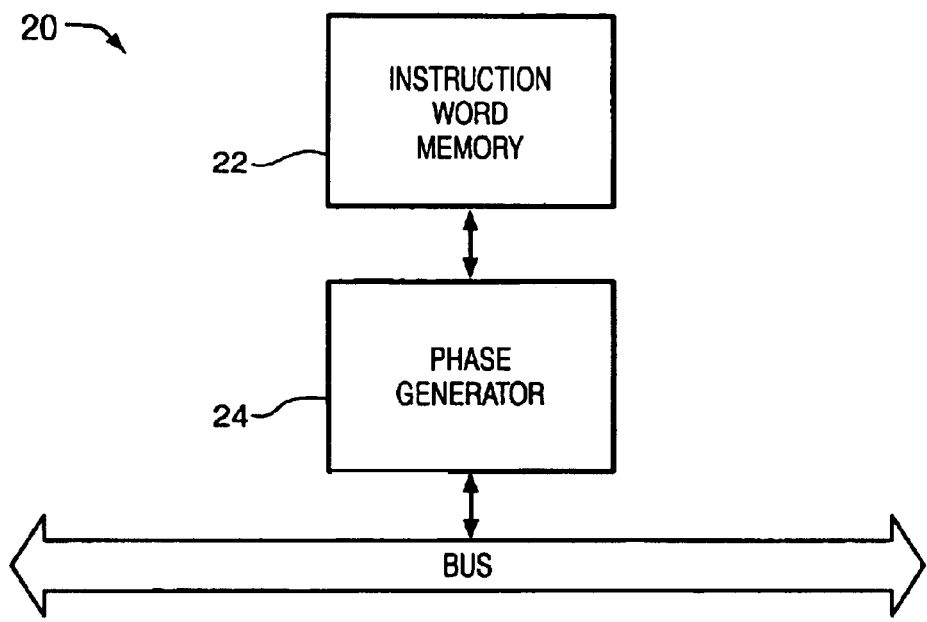
FIG. 2 is a block diagram of a bus transaction generator in accordance with an embodiment of the present invention.

FIG. 2 is a block diagram illustrating an embodiment of a transaction generator 20 in accordance with the present invention. The transaction generator 20 includes an instruction memory 22 that stores one or more predefined representations of bus stimuli and at least one phase generator 24 coupled to a bus 26 that provides the bus stimuli in response to the instructions. The transaction generator 20 is coupled to the bus 26 via an appropriate connector, such as a male connector that mates with a processor socket on a motherboard. In one embodiment of the invention, the phase generator 24 further tracks the state of the bus 26 and responds to stimuli received from the bus 26.

Figure 3:
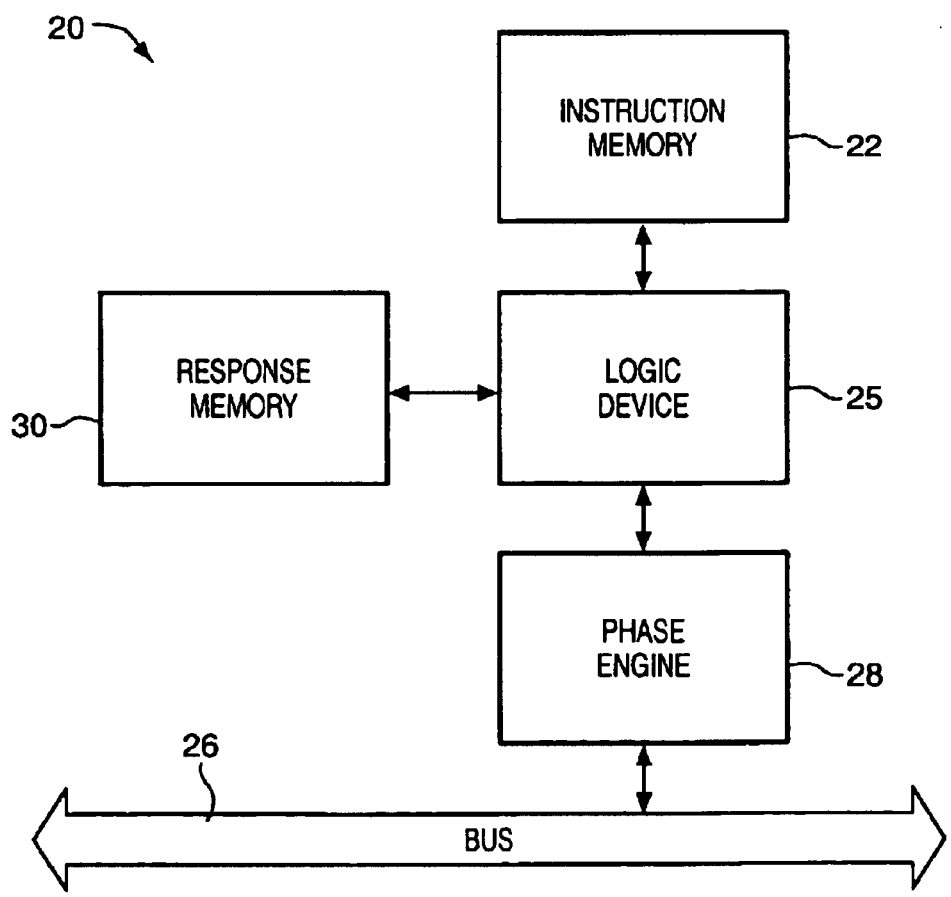
FIG. 3 is a block diagram of a bus transaction generator in accordance with another embodiment of the invention.

FIG. 3 illustrates an embodiment of the present invention in which the phase generator includes a digital logic device 25 and a phase engine 28 coupled between the instruction memory 22 and the bus 26. The logic device 25 includes the logic circuits and associated support circuits to implement the instructions stored in the instruction memory 22. The phase engine 28 functions to control the timing and logic levels of the bus stimuli. The embodiment illustrated in FIG. 3 also includes a response memory 30, which may store information relating to specific bus transaction phases and predefined responses to stimuli received from the bus 26.

Figure 4:
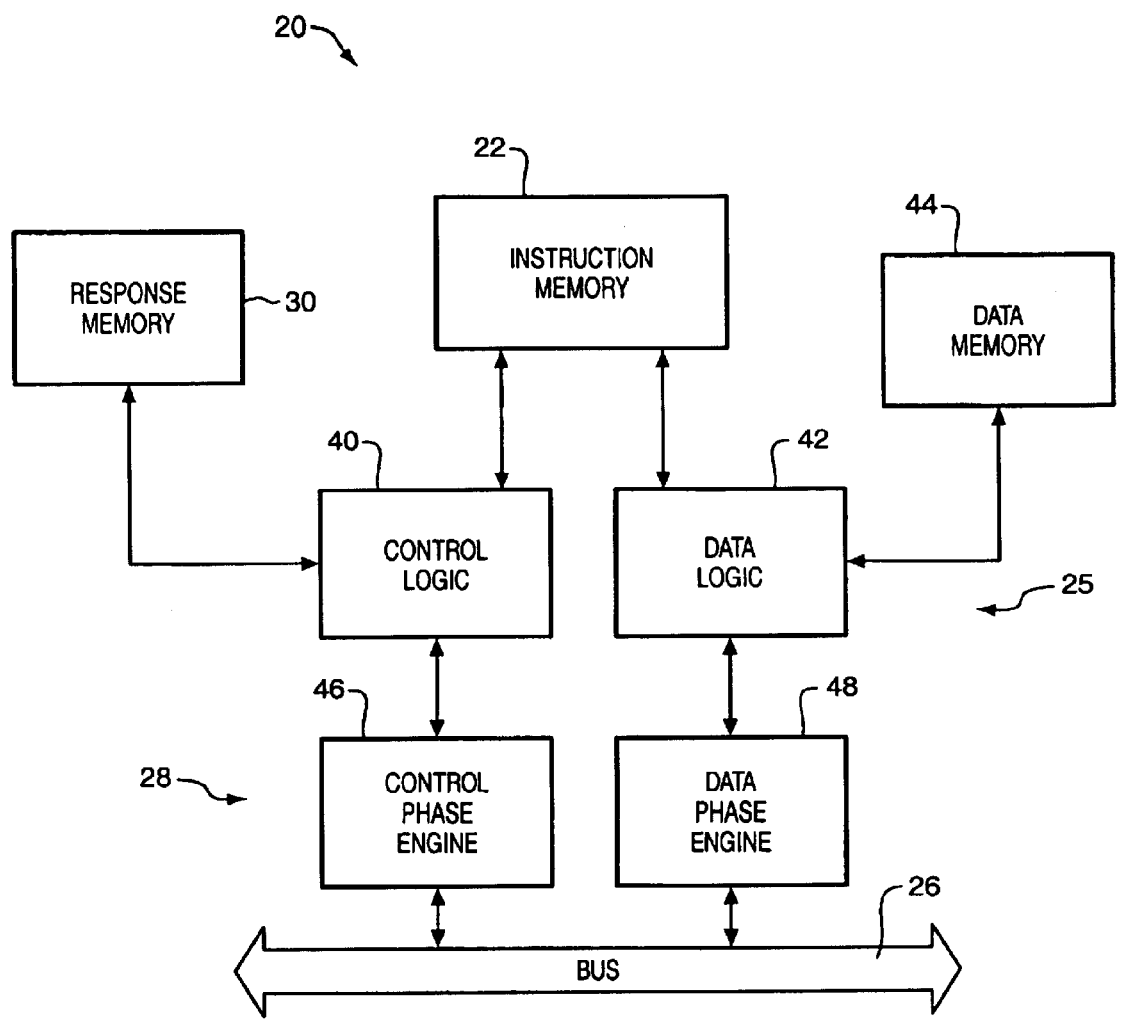
FIG. 4 is a block diagram that illustrates yet another embodiment of a bus transaction generator in accordance with the present invention

FIG. 4 is a block diagram that illustrates yet another embodiment of a transaction generator 20 in accordance with the present invention. The logic device 25 comprises a control portion 40 for controlling the phases of the bus transactions and a data portion 42. The control portion 40 generally arbitrates for bus ownership and executes the request portions of the bus transaction. The data portion 42 implements the data portions of a bus transaction. A data memory 44 is coupled to the data logic device 42 for storing data that is transmitted to or received from other agents on the bus 26. In a similar manner, the phase engines 28 comprise a control phase engine 46 and a data phase engine 48 for controlling the timing of the bus stimuli.

Figure 5:
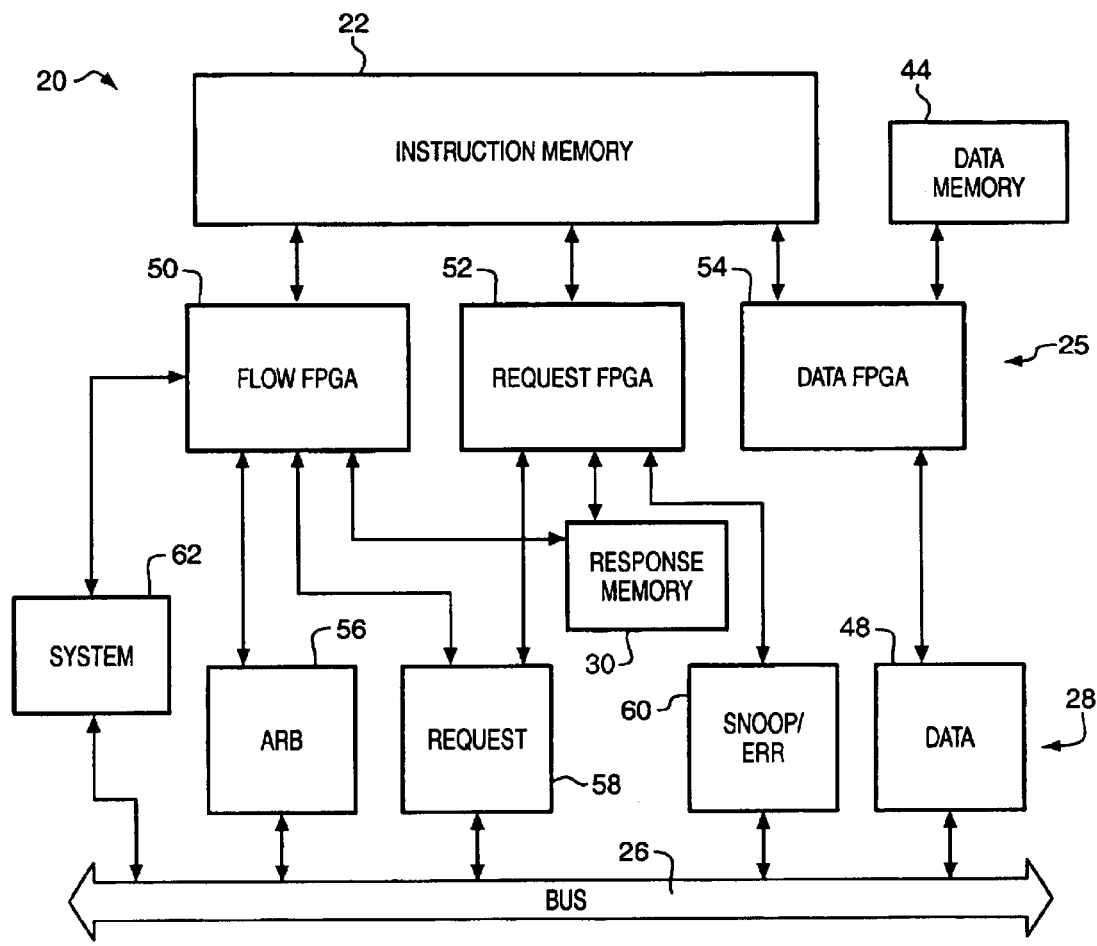
FIG. 5 is a block diagram illustrating a particular embodiment of a bus transaction generator in accordance with the present invention.

FIG. 5 is a block diagram illustrating a particular embodiment of a transaction generator 20 in accordance with the present invention. The embodiment of FIG. 5 implements the transaction generator 20 with an Intel® Pentium® Pro processor bus. While FIG. 5 illustrates an implementation of the transaction generator 20 with the Pentium® Pro processor bus, the present invention is not limited to any particular type of bus. It would be well within the ordinary skill in the art to apply, the present invention to other bus types by one in the art having the benefit of this disclosure. In the exemplary embodiment of FIG. 5, the logic device 25 comprises three field programmable gate arrays (FPGA) 50, 52, 54. Suitable FPGAs, for example, include model 4036XL or 4062XL FPGAs available from Xilinx® Inc., San Jose, Calif. The FPGAs 50, 52, 54 may be programmed using a hardware descriptive language as is known in the art, such as VHDL or Verilog. Alternately, application specific integrated circuits (ASIC) may be designed, or discrete logic devices may be arranged, to implement the digital logic functions of the transaction generator 20 by one skilled in the art having the benefit of this disclosure.

The three FPGAs 50, 52, 54 of the embodiment illustrated in FIG. 5 comprise a flow FPGA 50, a request FPGA 52 and a data FPGA 54. Each of the FPGAs 50, 52, 54 is coupled to the instruction memory 22, which in an embodiment of the invention comprises a static random access memory (SRAM) device. The data FPGA 54 is further coupled to the data memory 44, and the flow FPGA 50 and the request FPGA 52 are coupled to the response memory 30. The data memory 44 and response memory 30 also may comprise SRAM devices.

A plurality of phase engines 28 are coupled to the bus 26 to control the timing of the bus stimuli as generated by the FPGAs 50, 52, 54. The phase engines 28 in the specific embodiment illustrated in FIG. 5 generally correspond to the phases of a Pentium® Pro bus transaction, including an arbitration phase engine 56, a request phase engine 58, a snoop/error phase engine 60 and a data phase engine 48. If the transaction generator 20 is implemented with another type of bus, the specific phase engines employed may be different than illustrated in FIG. 5. Additionally, a system phase engine 62 is coupled between the flow FPGA 50 and the bus 26 for providing overall system control signals, such as for starting or resetting the system. The arbitration phase engine 56 is coupled to the flow FPGA 50, the request phase engine 52 is coupled to the flow FPGA 50 and the request FPGA 52, the snoop/error phase engine 60 is coupled to the request FPGA 52, and the data phase engine 48 is coupled to the data FPGA 54.

The phase engine(s) provides the transaction generator's capability to sense bus state on one clock and assert signals on the next clock. The phase engines may include logic level translation devices to translate between FPGA logic levels and the bus logic levels. Suitable devices for this purpose, for example, include model GTLP16612 Gunning Transceiver Logic devices, available from Fairchild Semiconductor Corp., South Portland, Maine. Inputs to the phase engines include the transaction information received from the appropriate FPGA, an aning state from the prior phase, and a small set of signals that are the sense values from the bus for the specific phase. A configuration register (not shown) dictates the assertion period for the specific phase. In the request phase, for example, the configuration register has a value of "001," indicating that the phase is three clocks long, and is asserted for the first two clocks. The arming signal is from the arbitration phase engine, which issues a signal at the state-time that the request phase engine should look for the sense values from the bus.

Figure 6:
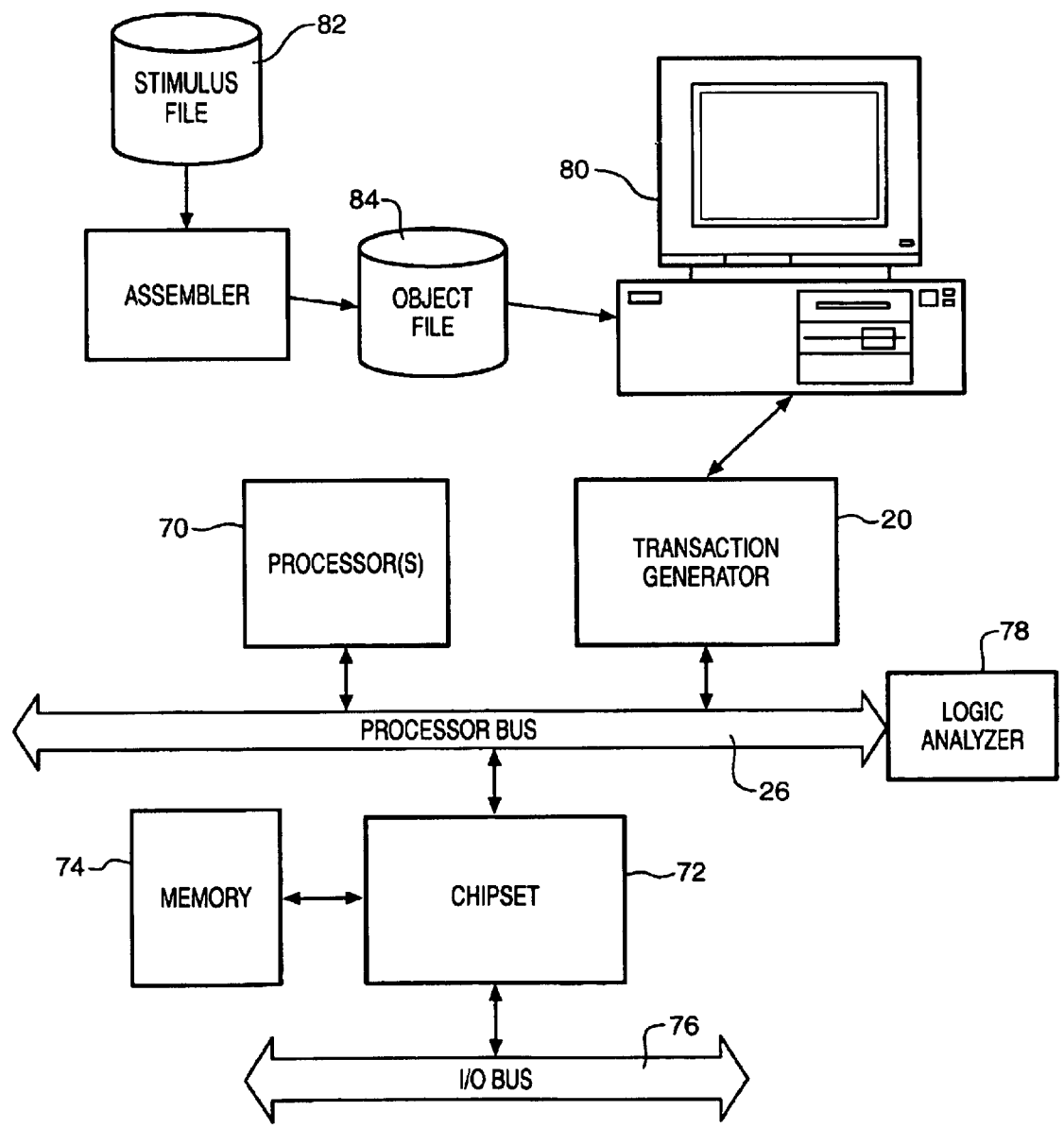
FIG. 6 illustrates a first exemplary implementation of a transaction generator in accordance with an embodiment of the invention.

FIG. 6 illustrates an implementation of an embodiment of the transaction generator 20 in accordance with the present invention. In FIG. 6, the transaction generator 20 is coupled to a bus 26, such as a processor bus. Other agents on the bus may include one or more processors 70 and a chipset 72, for example. In one embodiment, three processors 70 are coupled to the bus 26 in addition to the transaction generator 20, though the transaction generator 20 is capable of interacting with the bus 26 and other bus agents, such as the chipset 72, by itself with no additional processors 70 coupled to the bus 26. The chipset 72 is coupled to a memory device 74 and also provides a bridge to other buses 76 in the system, such as a PCI bus, ISA bus, etc. A logic analyzer 78 may be coupled to the bus 26 to capture the state of the devices coupled to the bus 26 during the bus transactions. The transaction generator 20 is coupled to a host computer system 80, such as a personal computer (PC).

A bus stimulus file 82 that may include a series of desired bus transactions is stored in the host system. The bus stimulus file 82 may be based on a user-defined series of bus transactions, an existing system simulation based on a BFM, a logic analyzer trace file, etc. The bus stimulus file 82 is assembled into a binary object file 84 that is provided to the transaction generator 20 along with set-up information.

The host computer 80 provides a programming and control interface to the transaction generator 20. In addition to providing the binary object file 84 containing the instructions to the instruction memory of the transaction generator 20, the host computer 80 programs the various logic devices in the transaction generator using standard software packages available for this purpose. Further, the host computer 80 may exchange data with the data memory of the transaction generator 20, and provide the proper responses to received bus signals to the transaction generator 20 response memory. Alternatively, the transaction generator 20 may be implemented without requiring a host computer 80. The transaction generator 20 may be configured such that necessary programming and control is provided by the system with which it is implemented. In other words, the processor(s) 70 coupled to the processor bus 26, along with the associated control and memory devices 72, 74 coupled to the system bus and other system components (not shown) coupled to the I/0 bus 76, may provide the programming and control functions of the host computer.

In a specific embodiment of the invention, bus stimuli and other instructions are formatted into instruction words having a predefined length. In an embodiment of the invention, the instruction words are 216 bits long. The instruction words are divided into predefined segments, each segment providing instructions to various portions of the transaction generator 20. For example, an instruction word may be divided into four segments, including a control portion that identifies the type of operation to be conducted, flow FPGA inputs that provide arbitration instructions and request attributes, response FPGA inputs that provide address and transaction type data, and data FPGA inputs that identify data memory addresses for data writes or reads. The composition of the instruction words will depend on the specific bus stimuli to be generated and the specific type of bus with which the transaction generator is implemented.

In one embodiment, such as the embodiment illustrated in FIG. 5, the transaction generator 20 is implemented with a Pentium® Pro processor bus 26, though the transaction generator 20 may be implemented with any type of bus by one in the art having the benefit of this disclosure. Thus, a bus transaction begins by arbitrating for bus ownership. For example, if the transaction generator 20 is coupled to the bus 26 in place of one processor in a multi-processor system, such as the Pentium® Pro system, it would assert an arbitration signal as a symmetric agent to request ownership of the request phase signals. If the transaction generator 20 is operating as a priority agent, such as a host/PCI bridge, it would assert the arbitration signal appropriate for a priority agent. The arbitration FPGA additionally may provide a request attribute, for example, a LOCK# signal to prevent a priority agent from taking ownership of the bus.

During the request phase of a Pentium® Pro system bus tnsaction, information about the transaction is output in two packets, packet A and packet B. During each packet, information is output on the bus address and request signal groups. Thus, the transaction generator instruction word request segment allows the user to specify what information is output to the bus 26 on the address and request signal groups in packet A and packet B. Similarly, the data FPGA portion of the instruction word allows a user to specify appropriate signals for the data phase of the transaction. The data memory 44 stores the data required (read or write) for the data phase of the transaction.

The response memory 30 stores the predefined responses to signals received from the bus during the error, snoop, and response phases of a bus transaction. For example, the transaction may be programmed to generate a HITM# signal indicating a snoop hit on a modified line. If the transaction generator 20 is functioning as a response agent, it may be programmed to assert a DEFER# signal to indicate that it intends to defer the response to the transaction until a later time.

The system configuration illustrated in FIG. 6 may be used to test or verify various system components and configurations. Further, the test system may be modified from that illustrated in FIG. 6 to facilitate testing specific bus agents. For example, the configuration of FIG. 6 may be useful for validating the chipset 72 operations against processor bus stimuli in situations where the processor 70 is under development, prior to processor availability. It may also be used to generate system fault sequences that a processor 70 cannot mimic. To test the chipset 72, for example, a series of processor bus stimuli are defined, then assembled into a binary object file that is provided to the transaction generator 20. The system is initialized and the transaction generator 20 implements the bus stimuli. The logic analyzer 78 may then capture the chipset 72 responses during each bus clock for subsequent analysis.

Additionally, the configuration of FIG. 6 is useful for providing controlled, "background" bus traffic when testing system operation. System bugs often occur during a specific sequence of bus transactions. Often, these bugs do not repeat under controlled scenarios with minimal bus traffic. The transaction generator 20 may be used to generate high volumes of complex bus transactions, making bugs more apparent. Interagent transactions may be investigated, and fault sequences may be repeated under controlled conditions. A series of bus transactions may be defined, then programmed to repeat, or loop, for a predetermined number of cycles to stress the bus. Further, the transaction generator may be programred to intentionally generate errors. The predefined sequence of bus transactions may include "illegal" bus sequences, for example, to determine the ability of the system under test to respond to faults.

Initially, background bus traffic may be generated without data checking to quickly identify catastrophic failures, or "splats," such as a complete system lock-up. More sophisticated tests, which include data checking, may be conducted. For example, the transaction generator 20 may be programmed to write preselected data to a location in the memory device 74, then the processor 70 is instructed to read the data. Any data discrepancies may then be correlated to the logic analyzer trace file to isolate the source of the problem. Alternatively, the transaction generator 20 may be programmed to compare the write data to the read data, and record any discrepancies for later analysis.

Figure 7:
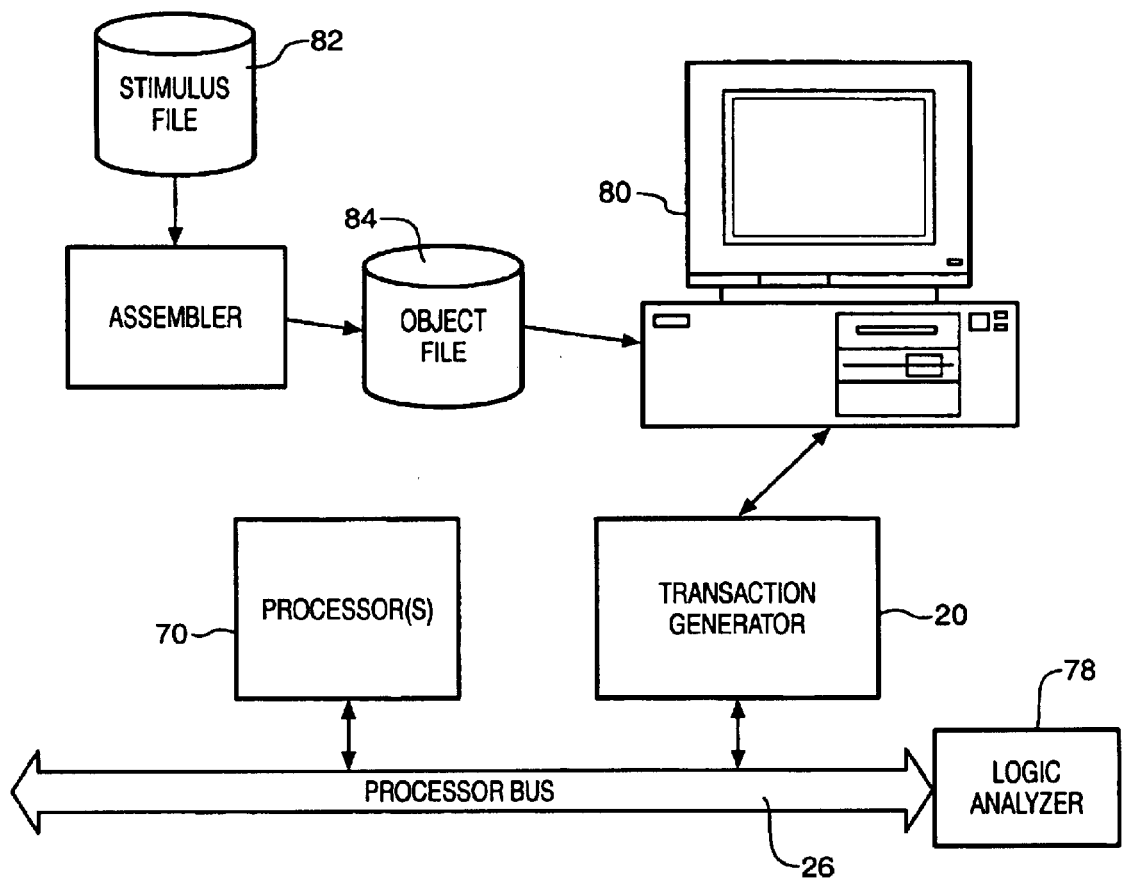
FIG. 7 illustrates a second exemplary implementation of a transaction generator in accordance with an embodiment of the invention.

FIG. 7 illustrates an alternate implementation of the transaction generator 20 that may be used to test the processor 70 operations that are unsupported by an existing chipset. At least one processor 70 is coupled to the bus 26, along with the transaction generator 20. The transaction generator 20 is used to emulate protocol and data operations for agents addressed by the processor 70. In a manner similar to the configuration of FIG. 6, fault sequences may be repeated under program control.

The particular embodiments disclosed above are illustrative only, as the invention may be modified and practiced in different but equivalent manners apparent to those skilled in the art having the benefit of the teachings herein. For example, the transaction generator could be configured to operate with virtually any type of bus by one skilled in the art having the benefit of this disclosure. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A system comprising:
    a connector to a bus;
    an instruction memory to store a bus stimuli instruction, the instruction having a predefined length, the instruction containing a plurality of segments, the plurality of segments including at least a flow segment and a data segment;
    a logic device coupled with the instruction memory to receive the bus stimuli instruction and generate digital logic based on the bus stimuli instruction, the logic device comprising a flow portion, a request portion, and a data portion, the flow portion to receive at least the flow segment from the instruction memory, and the data portion to receive at least the data segment from the instruction memory, the flow portion, the request portion, and the data portion each comprising a device selected from the group consisting of a field programmable gate array and an application specific integrated circuit;
    a plurality of phase engines coupled between the logic device and the connector to translate the digital logic into signals and provide the signals to the bus, the plurality of phase engines including a system phase engine, an arbitration phase engine, a request phase engine, a snoop/error phase engine, and a data phase engine, the system phase engine, the arbitration phase engine, and the request phase engine coupled with the flow portion, the snoop/error phase engine coupled with the request portion, the data phase engine coupled with the data portion;
    further comprising a response memory coupled with the flow portion and the request portion to store response information; and
    further comprising a data memory coupled with the data portion to store data.

2. The system of claim 1, further comprising an interface to a computer to receive the bus stimuli instruction.

3. The system of claim 1, wherein the bus stimuli instruction is based on an existing simulation stimulus software.

4. A system comprising:
    a containing a file that is based on an existing simulation stimulus software and that contains a plurality of bus stimuli instructions that represent a predefined sequence of bus transactions, wherein each transaction has a plurality of transaction phases;
    a processor bus;
    a transaction generator containing a first connector coupled to the computer to receive the file and containing a second connector coupled to the bus to provide a plurality of bus compatible signals to the bus, the transaction generator further containing:
    an instruction memory to store the file; and
    one or more phase generators coupled with the instruction memory to receive the plurality of bus stimuli instructions and to generate the plurality of bus compatible signals that represent the predefined sequence of bus transactions,
    wherein the one or more phase generators includes a logic device selected from the group consisting of field programmable gate array and an application specific integrated circuit to implement the instructions as digital logic, and
    wherein the one or more phase generators include a translation device coupled between the logic device and the bus to translate the digital logic to the plurality of bus compatible signals; and
    a component selected from the group consisting of a processor and a chipset coupled to the bus to respond to the plurality of bus compatible signals.

5. The system of claim 4, further comprising a logic analyzer coupled with the bus to capture information associated with the response of the component to the plurality of bus compatible signals.

6. The system of claim 4, wherein the plurality of bus stimuli instructions are based on a high level language.

7. A method comprising:
    coupling a component to a bus;
    coupling a device comprising an instruction memory and a phase generator to the bus;
    storing a plurality of instructions representing a predefined sequence of bus transactions in the instruction memory;
    providing the plurality of instructions from the instruction memory to the phase generator;
    using the phase generator to provide signals representing the predefined sequence of bus transactions to the bus based on the plurality of instructions; and
    detecting a bug of the component by determining an incorrect response of the component to the predefined sequence of bus transactions.

8. A component designed to eliminate a bug detected by the method of claim 7, wherein the component comprises a processor.

9. A component designed to eliminate a bug detected by the method of claim 7, wherein the component comprises a chipset.

10. The method of claim 7, further comprising specifying the plurality of instructions in a high level language.

11. The method of claim 7, further comprising deriving the plurality of instructions from at least one selected from a bus functional model, simulation, and logic analyzer trace file.

12. The method of claim 7, further comprising repeating using the phase generator to provide signals representing the predefined sequence of bus transactions to the bus in order to stress the bus.

* * * * *